(12) United States Patent
Lin et al.

(10) Patent No.: US 9,589,284 B2
(45) Date of Patent: *Mar. 7, 2017

(54) NETWORK ADVERTISING SYSTEM

(71) Applicant: Fortinet, Inc, Sunnyvale, CA (US)

(72) Inventors: Kunhua Lin, Coquitlam (CA); Michael Xie, Palo Alto, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/068,562

(22) Filed: Mar. 12, 2016

(65) Prior Publication Data

US 2016/0217505 A1    Jul. 28, 2016

Related U.S. Application Data

(63) Continuation of application No. 11/408,643, filed on Apr. 21, 2006, now Pat. No. 9,324,081.

(51) Int. Cl.
*G06F 15/16* (2006.01)
*G06Q 30/02* (2012.01)
*H04L 29/08* (2006.01)

(52) U.S. Cl.
CPC ......... *G06Q 30/0277* (2013.01); *G06Q 30/02* (2013.01); *H04L 67/02* (2013.01); *H04L 67/2804* (2013.01); *H04L 67/303* (2013.01)

(58) Field of Classification Search
None
See application file for complete search history.

(56) References Cited

U.S. PATENT DOCUMENTS

| | | | |
|---|---|---|---|
| 6,185,586 B1 | 2/2001 | Judson | |
| 6,463,468 B1 | 10/2002 | Buch et al. | |
| 6,564,243 B1 * | 5/2003 | Yedidia | H04L 29/06 704/217 |
| 7,376,714 B1 | 5/2008 | Gerken | |

(Continued)

OTHER PUBLICATIONS

Notice of Allowance for U.S. Appl. No. 11/408,643 mailed Mar. 2, 2016.

(Continued)

*Primary Examiner* — Esther B Henderson
(74) *Attorney, Agent, or Firm* — Hamilton, DeSanctis & Cha LLP

(57) ABSTRACT

Systems and methods for transmitting content to a client via a communication network are provided. According to one embodiment, an insertion server running within a firewall device of a network observes a content request of an application protocol by monitoring or proxying transport communication protocol connections established through the firewall device. The content request is (i) originated by a client device coupled to the network, (ii) directed to a destination device coupled to the network and (iii) associated with one of the multiple transport communication protocol connections. Responsive to observing the content request, the insertion server determines whether one or more conditions are satisfied. If so, the content request is negated by causing a canceling message of the transport communication protocol to be sent to the destination device and unsolicited content is selected and delivered to the client device via the application protocol.

20 Claims, 6 Drawing Sheets

(56) References Cited

U.S. PATENT DOCUMENTS

| | | |
|---|---|---|
| 7,624,184 B1 | 11/2009 | Aviani et al. |
| 7,840,645 B1 | 11/2010 | Chase et al. |
| 9,299,079 B2 | 3/2016 | Lin et al. |
| 9,324,081 B2 | 4/2016 | Lin et al. |
| 2004/0093394 A1 | 5/2004 | Weber et al. |
| 2005/0190706 A1* | 9/2005 | Henderson ............. H04M 3/56 370/260 |
| 2007/0078713 A1 | 4/2007 | Ottt et al. |
| 2007/0156838 A1 | 7/2007 | Kocho et al. |
| 2007/0266091 A1 | 11/2007 | Lin et al. |
| 2011/0125869 A1 | 5/2011 | Lin et al. |

OTHER PUBLICATIONS

Examiner's Answer to Appeal for U.S. Appl. No. 11/408,643 mailed Mar. 1, 2013.
Final Rejection for U.S. Appl. No. 11/408,643 mailed May 9, 2012.
Non-Final Rejection for U.S. Appl. No. 11/408,643 mailed Mar. 18, 2011.
Requirement for Restriction/Election for U.S. Appl. No. 11/408,643 mailed Jan. 18, 2011.
Notice of Allowance for U.S. Appl. No. 13/016,959 mailed Feb. 19, 2016.
Final Rejection for U.S. Appl. No. 13/016,959 mailed Nov. 30, 2011.
Non-Final Rejection for U.S. Appl. No. 13/016,959 mailed Apr. 6, 2011.
Non-Final Rejection for U.S. Appl. No. 13/016,959 mailed Jun. 7, 2012.
Non-Final Rejection for U.S. Appl. No. 13/016,959 mailed Dec. 7, 2012.
Final Rejection for U.S. Appl. No. 13/016,959 mailed Nov. 27, 2015.

* cited by examiner

NETWORK ADVERTISING SYSTEM

CROSS-REFERENCE TO RELATED APPLICATIONS

This application is a continuation of U.S. patent application Ser. No. 11/408,643, filed Apr. 21, 2006, now U.S. Pat. No. 9,324,081, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright ©2006-2016 Fortinet, Inc.

FIELD

Various embodiments of the present invention generally relate to systems and methods for delivering content. In particular, various embodiments relate to delivering unsolicited content, such as advertising content, to a client via a communications network such as the Internet.

BACKGROUND

Currently, advertising over the Internet is done by inserting advertisements into webpages on websites. The code for the webpage includes advertising content or one or more links to advertising servers that produce advertisements either on the webpage itself (in-line advertising) or in a separate window for the advertisement ("pop-up" or "pop-under" advertising). The types of advertisements are controlled by the content provider for the website as the advertising is built into the webpage code. However, the advertisement is limited in that the advertisement is only viewed by end-users who visit the website and run the code. In this respect, Internet advertising works much like billboards on a highway in that the advertisements are only seen by those who travel there.

This method presents two problems. First, there is no way to direct advertising to users who are not visiting a given website. The result is a smaller potential target audience for advertisers, as the audience is based on the visitors to any given website, which is a fraction of the total users on the Internet at any given time. Second, the advertising content is arranged by the content provider for the website. The Internet service provider (ISP), who is responsible for providing the bandwidth for the Internet and often the hardware for hosting the website, is not provided with a means of advertising on the Internet itself.

Thus, a need exists for systems and methods for directly targeting and directing advertisements to end users.

SUMMARY

Systems and methods are described for transmitting content to a client. According to one embodiment, unsolicited content is delivered to a client device. An insertion server running within a firewall device of a private Internet Protocol (IP) network observes a content request of an application protocol by monitoring or proxying multiple transport communication protocol connections established through the firewall device. The content request is (i) originated by a client device coupled to the private IP network, (ii) directed to a destination device coupled to the private IP network and (iii) associated with a transport communication protocol connection of the multiple transport communication protocol connections. Responsive to observing the content request, the insertion server determines whether one or more conditions associated with one or more of the client device, the destination device and the content request are satisfied. If so, the content request is negated by the insertion server by causing a canceling message of the transport communication protocol to be sent to the destination device, unsolicited content is caused by the insertion server to be selected for delivery to the client device and the selected unsolicited content is sent to the client device by the insertion server via the application protocol.

A more complete understanding of various embodiments of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
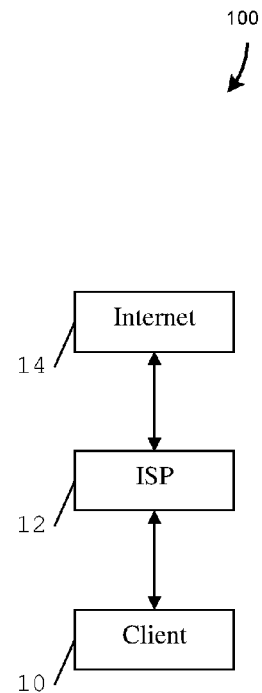
FIG. 1 illustrates a block diagram showing the connection between a client and the Internet in accordance with one or more embodiments of the present invention.

Various embodiments of the present invention generally relate to systems and methods for delivering content. In particular, various embodiments relate to delivering advertising content to a client via a communications network such as the Internet. In addition, various embodiments provide for systems and methods of transmitting content over a communication network to a client without the need to run code from the destination (e.g., website) selections of that client.

According to one embodiment, a system and method of transmitting content over a communications network that is capable of use and exploitation by an ISP, enterprise, and/or the like may be provided. According to one embodiment, a method may include one or more of the following steps: 1) intercepting a data transfer protocol request and/or response;

2) analyzing information contained within the intercepted data transfer protocol request/response; 3) selecting advertising content to send to the requesting/intended client; and 4) sending the selected content to the client. In one embodiment, the content may be selected based on information contained within the communication protocol request and/or response, such as information indicative of the client (e.g., an IP address used alone or as an index or key to retrieve a profile associated with the client), information indicative of the destination (e.g., an IP address used alone or as an index or key to retrieve a profile associated with the destination), the Request-URI in the HTTP request method, the Host field in the HTTP request header, the content in the response, such as the webpage content (e.g., keywords in the page).

According to various embodiments of the present invention, the systems and methods may be used at an enterprise level in order to intercept communication protocol requests/responses and deliver content, such as advertisements. For example, a hotel may provide internet service to its customers. According to one embodiment, a hotel may intercept the communication protocol requests originated by those clients using the hotel's internet service or the communication protocol responses destined for those clients using the hotel's internet service, analyze information contained within the intercepted communication protocol request/response, select advertising content to send to the client, and send the selected content to the client. According to one embodiment, a hotel may create a client profile. For example, an enterprise, such as a hotel may create a client profile by collecting and storing information about a client through a membership program, optional questionnaires, and/or the like. This information may then be accessed using the information contained within the data transfer protocol request. Then, an appropriate advertising choice may be based on the client profile. In some embodiments, no client profile is used. In this case, an enterprise, such as a hotel, may send advertisements as they become available, or on a pre-allocated basis. In one embodiment, pre-allocating an advertisement refers to determining the percentage one advertisement will be delivered in relation to other advertisements.

In one embodiment, the advertising content may be delivered via the same communications methodology used to make the request or provide the response. For example, if a client is making an HTTP request, then advertising content may be delivered via HTTP. In some embodiments, additional information is known about the client and advertisements can be delivered via another communication method. For example, when an HTTP session is detected as active, an advertising system may send a message to the client's instant messenger while the HTTP session continues without interference.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

For the sake of illustration, various embodiments of the present invention have herein been described in the context of computer programs, physical components, and logical interactions within modern computer networks. Specifically, for convenience, embodiments of the present invention are described with reference to detecting an active session or connection by intercepting or observing TCP/IP requests over the Internet originated by clients. However, embodiments of the present invention are equally applicable to detecting an active communication protocol session or connection by intercepting or observing TCP/IP responses intended for clients.

Additionally, embodiments of the present invention are equally applicable to various other transport protocols, systems, devices, and networks as one skilled in the art will appreciate. For example, various embodiments may be used in conjunction with communications networks, such as WANs, LANs, other computer networks, telephone systems, and/or the like. More specifically, embodiments are applicable to multiple levels of implementation. For example, communication systems, services, enterprises, and devices such as cell phone networks and compatible devices. In addition, embodiments are applicable to all levels of computing from the personal computer to large network mainframes and servers. Additionally, monitoring and/or proxying of other transport communication protocol connection requests and/or responses, such as User Datagram Protocol (UDP), Datagram Congestion Control Protocol (DCCP), Stream Control Transmission Protocol (SCTP), IL, Reliable User Datagram Protocol (RUDP), AppleTalk Echo Protocol (AEP), AppleTalk Transaction Protocol (ATP), Cyclic UDP (CUDP), Name Binding Protocol (NBP), NetBIOS Extended User Interface (NetBEUI), Routing Table Maintenance Protocol (RTMP), Sequenced Packet Exchange (SPX) protocol, Network News Transport Protocol (NNTP), Real-time Transport Protocol (RTP) and/or the like, may be used in accordance with the specific communications network as known to those skilled in the art. Terminology Brief definitions of terms, abbreviations, and phrases used throughout this application are given below.

The phrase "advertising content" generally refers to the promotion of products, services, brands, ideas, companies, and/or the like. Advertising content may be delivered in a variety of formats. Examples include, but are not limited to, pop-up advertisements, pop-under advertisements, voice advertisements, various text advertisements, and/or the like.

The phrase "communication network" or term "network" generally refers to a group of interconnected devices capable of exchanging information. A communication network may be as few as several personal computers on a Local Area Network (LAN) or as large as the Internet, a worldwide network of computers. As used herein "communication network" is intended to encompass any network capable of transmitting information from one entity to another. In one particular case, a communication network is a Voice over Internet Protocol (VoIP) network. In some cases, a communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

The phrase "communication protocol" generally refers to any type of communication protocol used to facilitate the exchange of information between two devices connected to a communication network. For example, a communication protocol may include any data transfer protocol request. In one embodiment, a communication protocol may be an application protocol including, but not limited to DNS, FTP, HTTP, IMAP, IRC, NNTP, POP3, SIP, SMTP, SNMP, SSH, TELNET, BitTorrent, and the like. In one embodiment, a communication protocol may be a transport protocol including, but not limited to DCCP, SCTP, TCP, RTP, UDP, IL, RUDP, and the like. Still yet in another embodiment, a communication protocol may be a network protocol including, but not limited to IPv4, IPv6, and the like. In accordance with one embodiment, a communication protocol may include an Ethernet protocol including, but not limited to Wi-Fi, Token ring, MPLS, PPP, and the like. Importantly, this definition is meant to be exemplary rather than limiting. As such, other protocols known to those skilled in the art are within the scope of this definition.

The terms "connected" or "coupled" and related terms are used in an operational sense and are not necessarily limited to a direct physical connection or coupling. Thus, for example, two devices may be couple directly, or via one or more intermediary media or devices. As another example, devices may be coupled in such a way that information can be passed there between, while not sharing any physical connection one with another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

FIG. 1 illustrates a block diagram showing the connection between a client and the Internet in accordance with one or more embodiments of the present invention. However, the choice of the Internet is for illustrative purposes and embodiments of the present invention are applicable to any type of communication network.

As shown in FIG. 1, a client 10, which according to one embodiment, may be a single computer or a computer network consisting of one or more computers. In the embodiment depicted, the computer(s) may be connected to the Internet 14 through an Internet Service Provider (ISP) 12. The ISP 12 is typically a cable or telephone company that provides the infrastructure for the Internet 14. This infrastructure consists of various elements of computer hardware and software, including physical cable connections, routers for connecting multiple connections, and computers for directing traffic, identifying users and authorizing access to the system.

According to one embodiment, communication between the client 10 and the Internet 14 uses TCP/IP ("transfer control protocol over internet protocol"). While a variety of different protocols are contained within TCP/IP, the most commonly used for retrieving webpages is the Hypertext Transfer Protocol (HTTP).

Figure 2:
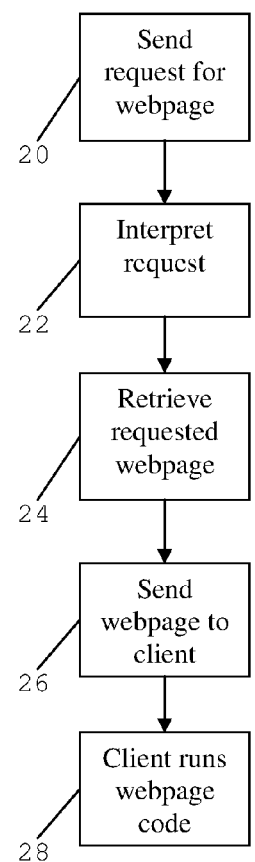
FIG. 2 illustrates a flowchart describing a process of interpreting a client HTTP request in accordance with one or more embodiments of the present invention.

As such, when the client 10 wishes to access the Internet 14 using HTTP, the process shown in FIG. 2 is followed. Specifically, FIG. 2 illustrates a flowchart describing a process of interpreting a client HTTP request in accordance with one or more embodiments of the present invention. A request is sent (20) to retrieve a desired webpage. The request is interpreted (22) and the webpage is retrieved (24) and sent to the client (26), where the webpage code is run on the client computer to produce the webpage (28).

It is at this last step 28 where conventional methods of advertising over the Internet take place. Code for the desired advertisement may be placed within the webpage code and run at the same time the code for the webpage is run. Alternatively, the code for the desired advertisement may be placed as a separate webpage code. The resulting advertisement is then produced according to the extra code.

Typical advertisement code may include scripts that retrieve advertisements from other web servers (i.e. separate from the server which hosts the webpage code), that open new windows on the client computer to display advertisements, or that even temporarily display an advertising webpage prior to allowing the client to view the desired webpage.

Regardless of the method of advertising used, each method is initiated within the code for the webpage. In other words, it is the client's selection of webpage and running of the code for that webpage that determines both whether advertising will be displayed and the types of advertisements shown.

According to various embodiments of the present invention, additional computer software and/or hardware may provided by the ISP 12 (as seen in FIG. 1), enterprise, or by the end user. As a result, advertising content can be selected and delivered at the interpreting step 22 (see FIG. 2) as opposed to the code running step 28 (also in FIG. 2). Alternatively, advertising content may be selected and delivered based on the HTTP response at step 26 (see FIG. 2).

Figure 3:
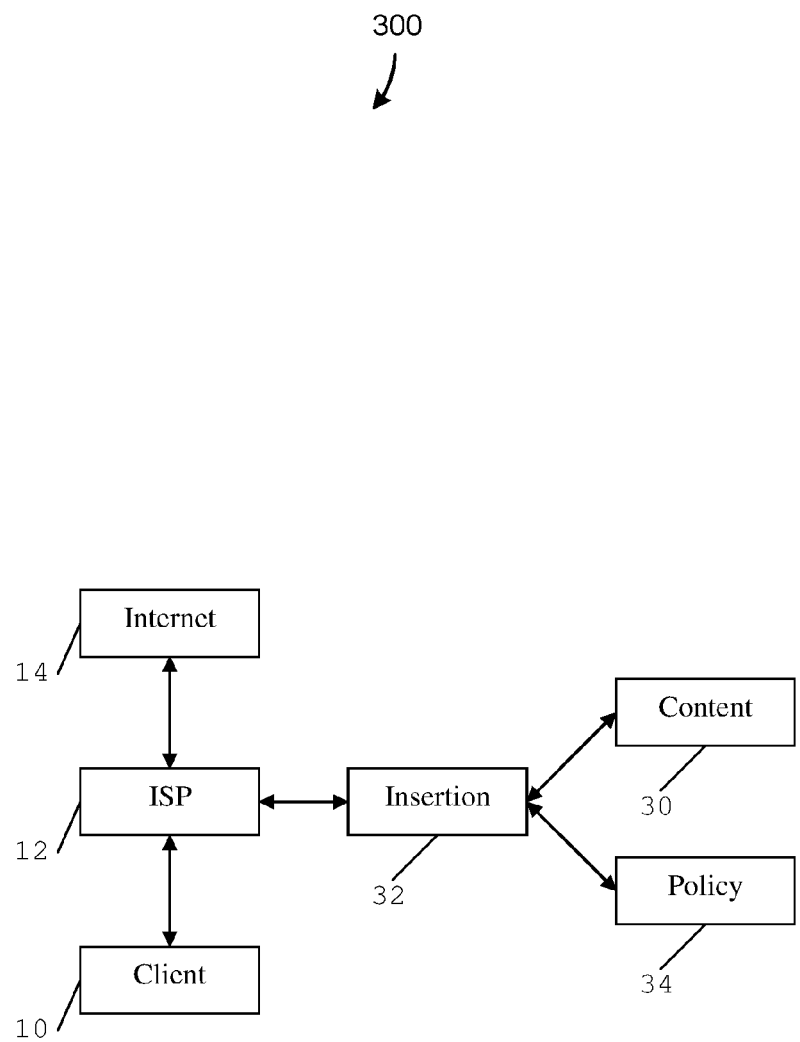
FIG. 3 illustrates a block diagram of various components of the present invention which may be used in accordance with one or more embodiments of the present invention.

According one embodiment of the present invention, the content delivery system may include three components provided by the ISP 12 as shown in FIG. 3. Content server 30 may be configured to store the content, such as advertisements, advertising content or other informational content, that is to be delivered to the client 10. Insertion server 32 may be configured to monitor client traffic and act to detect a client's communication protocol request, e.g., a HTTP request, and/or a destination's communication protocol response, e.g., a HTTP response, and substitute content from the content server 30 for the requested content or supplement the requested content with content from the content server 30. Alternatively, upon determining the existence of an active communication protocol connection or session between a destination and a client, the insertion server 32 may deliver content via another communication method by sending a message to the client's instant messenger, for example, while the HTTP session continues without interference.

In one embodiment, the insertion server 32 is implemented as a proxy server, transparent or not. The insertion server 32 may intercept all connections and connection with the destination on behalf of the client for all connections, whether needed to insert content or not. Alternatively, the insertion server 32 may only intercept connections when content insertion is desired as determined by the policy server 34.

Policy server 34 may be configured to determine when insertion server 32 detects a request or response, what content is delivered from content server 30, and how long the content is displayed to the client 10, e.g., the duration until the client's original HTTP request is fulfilled.

While in the embodiment depicted, insertion server 32 is shown connected to the ISP 12, for example, as part of a firewall between the client 10 and the Internet 14, it may also be located between the client 10 and the ISP 12. In this arrangement, rather than content hosted and provided by the ISP 12 at its level of the Internet infrastructure, the content may hosted at the network level of the client 10. For example, a location that provides Internet access to multiple clients, such as an enterprise, library or an Internet cafe, may set up its own content delivery system at its network connection to the ISP 12 in order to transmit selected content to clients on its network. In this configuration, the system may be set up as part of a network firewall to minimize overhead.

Figure 4:
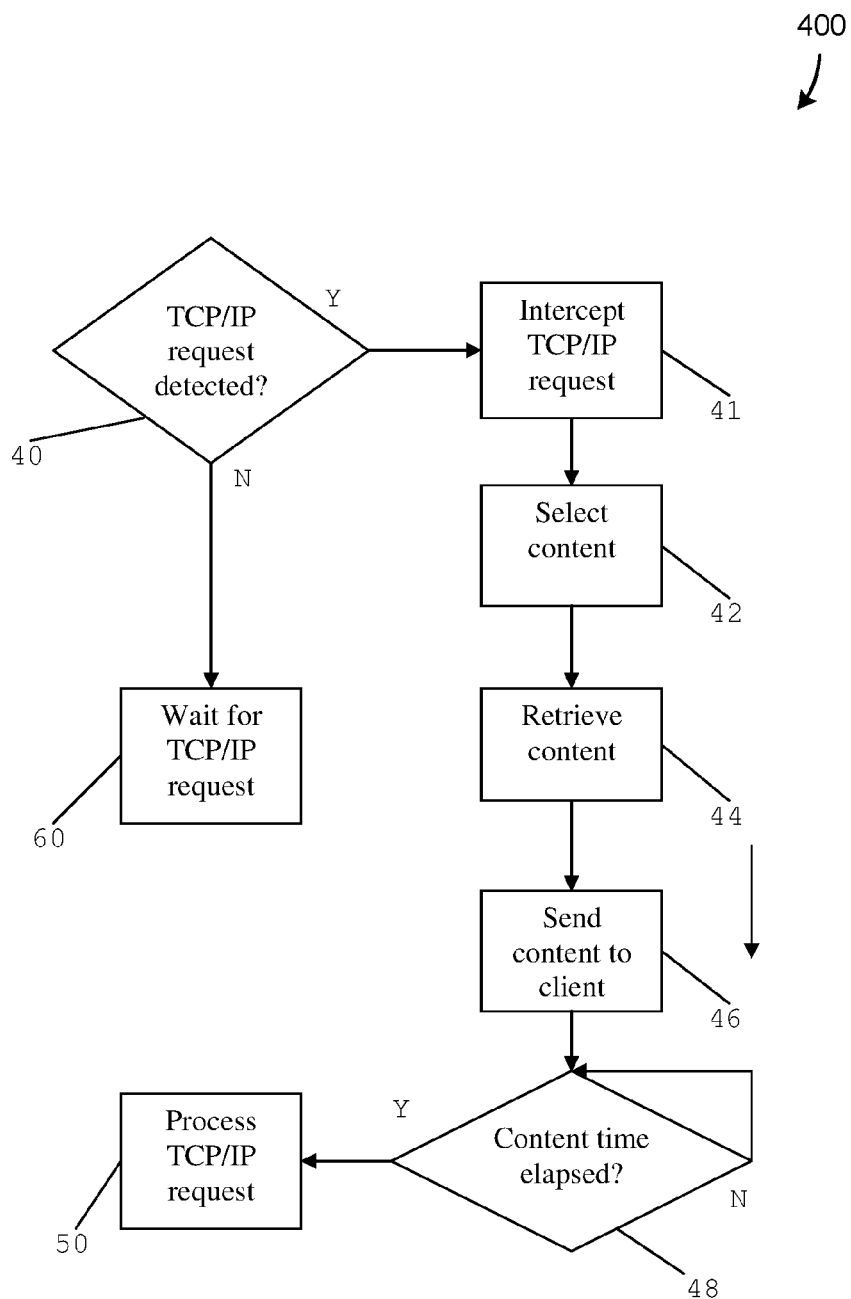
FIG. 4 illustrates a flowchart describing a process of detecting and intercepting a client TCP/IP request in accordance with one or more embodiments of the present invention.
Figure 5:
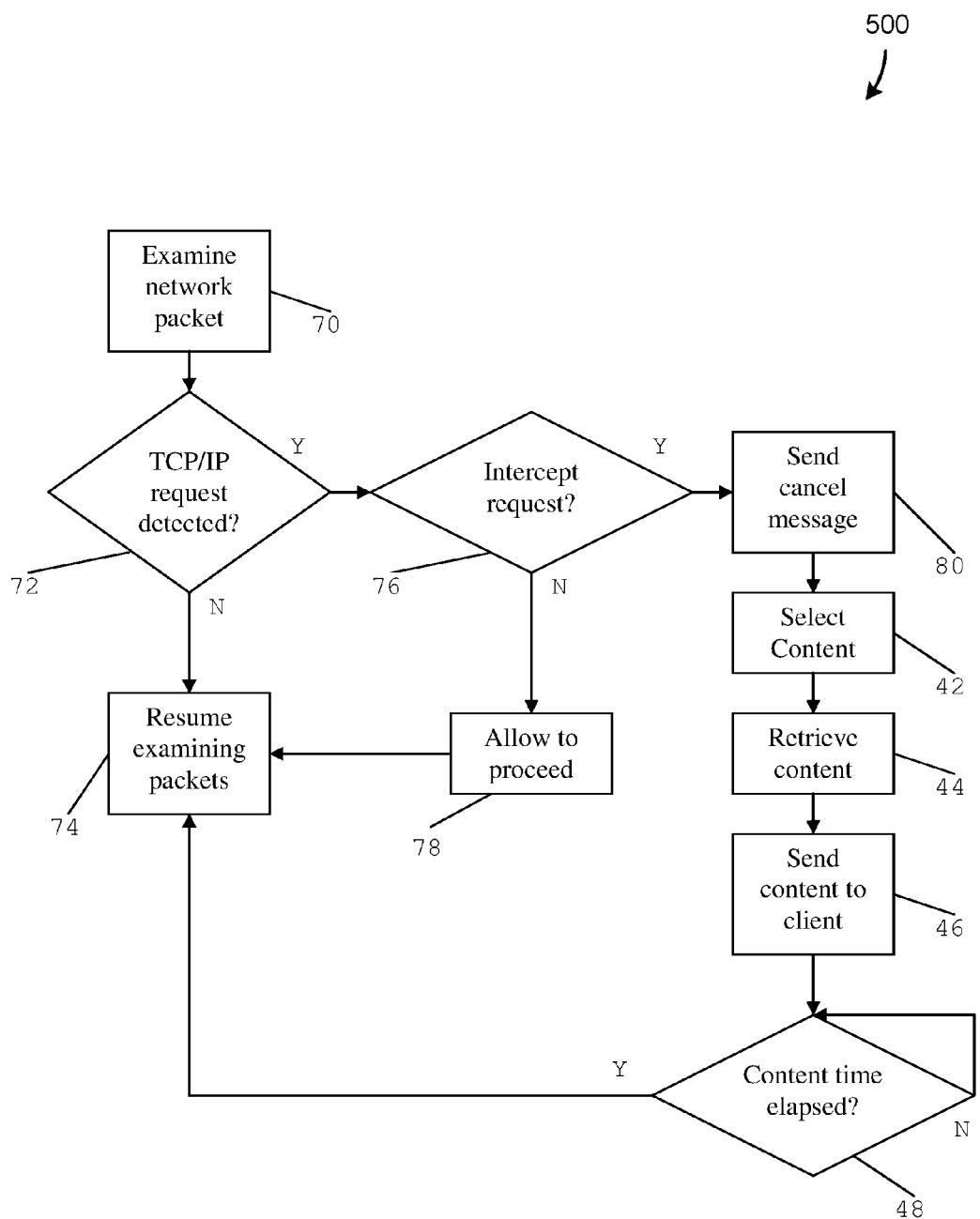
FIG. 5 illustrates a flowchart describing a process of detecting and inserting content into a TCP connection in accordance with one or more embodiments of the present invention.

FIG. 4 and FIG. 5. illustrate how the TCP/IP process may be modified in accordance with various embodiments of the present invention. Specifically, FIG. 4 illustrates a flowchart representative of a process of detecting and intercepting a client TCP/IP request in accordance with one or more embodiments of the present invention. Those skilled in the art will appreciate similar modifications may be made to the TCP/IP process when detecting and/or intercepting TCP/IP responses destined for a client.

FIG. 4, illustrates a "pass-through" method whereby the HTTP request is intercepted before reaching its intended destination. According to this embodiment, when the system is active, it waits for a client TCP/IP request to be detected 40. If there is no request, the system waits for one to be detected 60. This detection step 40 may be incorporated as part of existing firewall monitoring processes, such as the process used by a firewall to monitor for viruses and unauthorized network access attempts, for example.

Once a TCP/IP request is detected 40, it is intercepted 41 and the desired content is selected 42, retrieved 44 from the content server and sent 46 to the client. In one embodiment, the content may be selected based on information contained within the communication protocol request and/or response, such as information indicative of the client (e.g., an IP address used alone or as an index or key to retrieve a profile associated with the client), information indicative of the destination (e.g., an IP address used alone or as an index or key to retrieve a profile associated with the destination), the Request-URI in the HTTP request method, the Host field in the HTTP request header, the content in the response, such as the webpage content (e.g., keywords in the page).

After the content is sent 46, the process delays 48 thereby displaying the content to the client for a fixed amount of time before processing the original TCP/IP request 50. In this embodiment, the insertion server 32 acts as a proxy server handling the original TCP/IP request.

Alternatively, content may be delivered via a different communication method than used to detect the client/destination connection, concurrently with or completely in lieu of the requested content via the same communication method used to detect the client/destination connection.

According to yet another alternative embodiment, the insertion server 32 may determine the need for and/or select appropriate content to be delivered to the client based upon a "pass-through" method involving intercepting of HTTP responses before they reach the client.

FIG. 5 illustrates a flowchart describing a process of detecting and inserting content into a TCP connection in accordance with one or more embodiments of the present invention. According to the embodiment shown in FIG. 5, a "pass-by" methodology may be used. In this embodiment, network packets are examined 70 as they pass by on the network. When a TCP/IP request is detected 72, it is checked 76 against the policy for content insertion to determine if the packet should be intercepted. If the TCP/IP request is not to be intercepted, no action is taken and the TCP/IP request proceeds to its intended destination 78. If no TCP/IP request is detected, or the request is allowed to proceed the system resumes examining packets 74.

According to one embodiment, if the TCP/IP request is to be intercepted, then two actions may be taken. First, a canceling message may be sent 80 to the destination to negate the TCP/IP request. Second, the desired substitute or supplemental content may be selected 42, retrieved 44 and sent 46 to the client in lieu of or in addition to the content requested by the intercepted TCP/IP request.

According to one embodiment, the timing of the canceling message is such that it reaches the destination and the substitute or supplemental content is sent to the client before the destination can respond to the TCP/IP request. The system then delays 48 for a period of time to allow the substitute or supplemental content to be displayed at the client before resuming 74 the packet examination process.

In one embodiment, the original TCP/IP request may need to be re-sent by the client after the delay period 48 for displaying the content. If the canceling message 80 fails to reach the destination before it responds to the original TCP/IP request, the response will be ignored by the client as long as the content is sent 46 to the client before the response from the destination as the TCP connection has effectively been hijacked.

According to one embodiment, policy server 34 may require a limited number of instructions to execute the desired method of content insertion. In one embodiment, the instructions may specify the timing of detecting and intercepting (if required) a client's TCP/IP request and the duration of sending the advertisement to that client and completing (if necessary) the TCP/IP request. For example, a list of instructions for the pass-through method might include:

1) Every hour, begin the detection process on the insertion server 32;
2) For the next two minutes, intercept each TCP/IP request and send advertising content in addition to or in lieu of the content requested by the TCP/IP request;
3) For each intercepted TCP/IP request, complete that request ten seconds after sending the advertising content.

The last step of completing the original TCP/IP request is preferable, but optional according to various embodiments. Alternatively, according to one embodiment, the client may be required to re-send the TCP/IP request in the same manner that existing webpage-based interrupt advertising works. In accordance with one embodiment, during the advertising delay, the client cannot re-send the TCP/IP request until the time specified for the delay (ten seconds in the above example) has expired. This latter method may be preferable for certain types of non-advertising content which are discussed below.

According to various embodiments, more complex selection algorithms may be used. According to one embodiment, a selection algorithm may include identifying clients for advertising, thus allowing for more targeted advertising to clients and selective delivery of advertising content. This algorithm may also use certain content in the HTTP request (e.g. the domain or IP information) to select content suitable for the client.

Also, according to one embodiment, multiple insertion servers 32 can be used. When multiple insertion servers 32 are provided, a reduction on the load on each individual server may result as well as the ability to differentiate clients based on the server. According to one embodiment, this system may create different advertising system potentials for the ISP. For example, a system with multiple insertion servers 32 may (i) allow clients who pay a premium to have reduced or no advertising content, (ii) facilitate setting different advertising rates for regions which use more or less bandwidth, and/or (iii) allow individual servers to be provided for ISP clients which have their own large internal computer networks (large companies, universities, etc.).

While the above embodiments describe the use of advertising content, it is contemplated that the systems and methods described here in may be easily adapted for use with other types of suitable content. For example, a corporation may use the system to provide employees with daily updates and other information, with the assurance that the information is more likely to be read than if the information were transmitted via email alone. According to one embodiment, the systems and methods may be used by governments to provide emergency and disaster information, much in the same way that the Emergency Broadcasting System is used on television and radio.

Accordingly, while this invention has been described with reference to illustrative embodiments, such as the Internet and HTTP, this description is not intended to be construed in a limiting sense. Importantly, applications of various embodiments of the present invention are applicable to a wide variety of communication networks and communication protocols. Various modifications of the illustrative embodiments, as well as other embodiments of the invention, will be apparent to persons skilled in the art upon reference to this description.

Exemplary Computer System Overview

Figure 6:
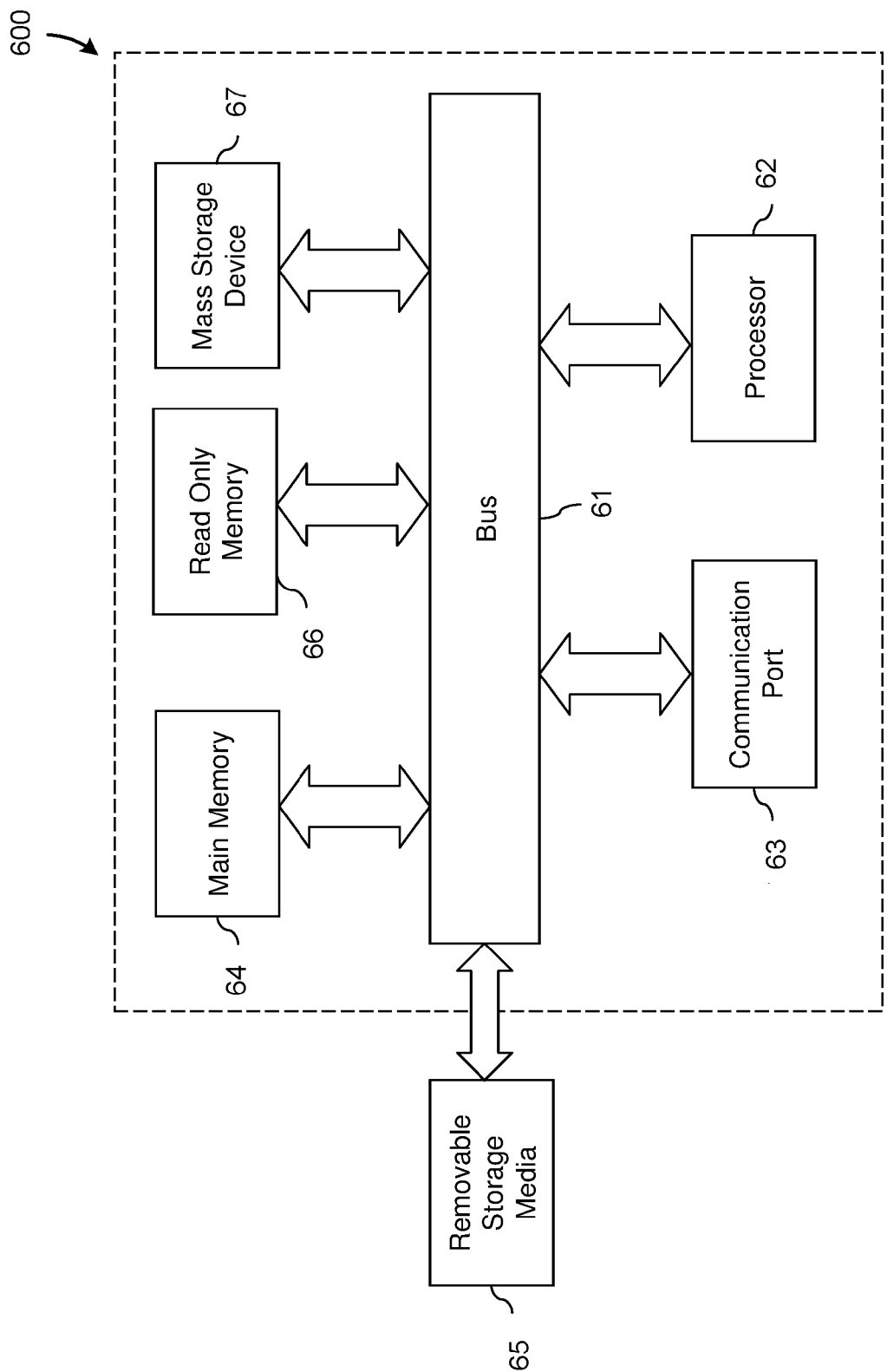
FIG. 6 illustrates an example of a computer system with which embodiments of the present invention may be utilized.

Embodiments of the present invention include various steps, which will be described in more detail below. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 60, such as a client or server (e.g., web server, content server, insertion server or policy server) with which embodiments of the present invention may be utilized. According to the present example, the computer system 60 includes a bus 61, at least one processor 62, at least one communication port 63, a main memory 64, a removable storage media 65 a read only memory 66, and a mass storage 67.

Processor(s) 62 can be any know processor, such as, but not limited to, an Intel® Itanium® or Itanium2® processor(s), or AMD Opteron® or Athlon MP® processor(s), or Motorola® lines of processors. Communication port(s) 63 can be any of an RS-232 port for use with a modem based dialup connection, a 10/100 Ethernet port, or a Gigabit port using copper or fiber. Communication port(s) 63 may be chosen depending on a network such a Local Area Network (LAN), Wide Area Network (WAN), or any network to which the computer system 60 connects.

Main memory 64 can be Random Access Memory (RAM), or any other dynamic storage device(s) commonly known in the art. Read only memory 66 can be any static storage device(s) such as Programmable Read Only Memory (PROM) chips for storing static information such as instructions for processor 62.

Mass storage 67 can be used to store information and instructions. For example, hard disks such as the Adaptec® family of SCSI drives, an optical disc, an array of disks such as RAID, such as the Adaptec family of RAID drives, or any other mass storage devices may be used.

Bus 61 communicatively couples processor(s) 62 with the other memory, storage and communication blocks. Bus 61 can be a PCI/PCI-X or SCSI based system bus depending on the storage devices used.

Removable storage media 65 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Optionally, operator and administrative interfaces (not shown), such as a display, keyboard, and a cursor control device, may also be coupled to bus 61 to support direct operator interaction with computer system 60. Other operator and administrative interfaces can be provided through network connections connected through communication ports 63.

The components described above are meant to exemplify some types of possibilities. In no way should the aforementioned examples limit the scope of the invention, as they are only exemplary embodiments.

In conclusion, the present invention provides novel systems, methods and arrangements for delivering advertising content to client systems. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method comprising:
observing, by an insertion server running within a firewall device of a private Internet Protocol (IP) network, a content request of an application protocol by monitoring or proxying a plurality of transport communication protocol connections established through the firewall device, wherein the content request is (i) originated by a client device coupled to the private IP network, (ii) directed to a destination device coupled to the private IP network and (iii) associated with a transport communication protocol connection of the plurality of transport communication protocol connections;
negating the content request, by the insertion server, by causing a canceling message of the transport communication protocol to be sent to the destination device;
causing, by the insertion server, unsolicited content to be selected for delivery to the client device; and
sending, by the insertion server, the selected unsolicited content to the client device via the application protocol.

2. The method of claim 1, wherein the transport communication protocol comprises Transmission Communication Protocol (TCP).

3. The method of claim 2, wherein the application protocol comprises Hypertext Transfer Protocol (HTTP).

4. The method of claim 3, wherein a domain identified within the content request is used in connection with selection of the selected unsolicited content for delivery to the client device.

5. The method of claim 4, wherein the selected unsolicited content comprises advertising content.

6. The method of claim 3, wherein a profile associated with the client device is used in connection with selection of the selected unsolicited content for delivery to the client device.

7. The method of claim 3, wherein a profile associated with the destination device is used in connection with selection of the selected unsolicited content for delivery to the client device.

8. The method of claim 3, wherein a Request-URI within the content request or a Host field within a header of the content request are used in connection with selection of the selected unsolicited content for delivery to the client device.

9. The method of claim 1, wherein the private IP network comprises an Internet Service Provider (ISP) network.

10. The method of claim 1, wherein the private IP network comprises a Local Area Network (LAN) of a corporation that provides on-premises Internet service to its customers.

11. A non-transitory computer-readable storage medium embodying a set of instructions, which when executed by one or more processors of a firewall device of a private Internet Protocol (IP) network, cause the one or more processors to perform a method comprising:

observing a content request of an application protocol by monitoring or proxying a plurality of transport communication protocol connections established through the firewall device, wherein the content request is (i) originated by a client device coupled to the private IP network, (ii) directed to a destination device coupled to the private IP network and (iii) associated with a transport communication protocol connection of the plurality of transport communication protocol connections;

negating the content request, by the insertion server, by causing a canceling message of the transport communication protocol to be sent to the destination device;

causing, by the insertion server, unsolicited content to be selected for delivery to the client device; and sending, by the insertion server, the selected unsolicited content to the client device via the application protocol.

12. The non-transitory computer-readable storage medium of claim 11, wherein the transport communication protocol comprises Transmission Communication Protocol (TCP).

13. The non-transitory computer-readable storage medium of claim 12, wherein the application protocol comprises Hypertext Transfer Protocol (HTTP).

14. The non-transitory computer-readable storage medium of claim 13, wherein a domain identified within the content request is used in connection with selection of the selected unsolicited content for delivery to the client device.

15. The non-transitory computer-readable storage medium of claim 14, wherein the selected unsolicited content comprises advertising content.

16. The non-transitory computer-readable storage medium of claim 13, wherein a profile associated with the client device is used in connection with selection of the selected unsolicited content for delivery to the client device.

17. The non-transitory computer-readable storage medium of claim 13, wherein a profile associated with the destination device is used in connection with selection of the selected unsolicited content for delivery to the client device.

18. The non-transitory computer-readable storage medium of claim 13, wherein a Request-URI within the content request or a Host field within a header of the content request are used in connection with selection of the selected unsolicited content for delivery to the client device.

19. The non-transitory computer-readable storage medium of claim 11, wherein the private IP network comprises an Internet Service Provider (ISP) network.

20. The non-transitory computer-readable storage medium of claim 11, wherein the private IP network comprises a Local Area Network (LAN) of a corporation that provides on-premises Internet service to its customers.

* * * * *